United States Patent [19]

Zushi

[11] Patent Number: 5,286,055
[45] Date of Patent: Feb. 15, 1994

[54] MODULAR COVER FOR AN AIR BAG ASSEMBLY

[75] Inventor: Takayasu Zushi, Hikone, Japan

[73] Assignee: Takata Corporation, Tokyo, Japan

[21] Appl. No.: 778,924

[22] PCT Filed: Jun. 18, 1991

[86] PCT No.: PCT/JP91/00810

§ 371 Date: Dec. 10, 1991

§ 102(e) Date: Dec. 10, 1991

[87] PCT Pub. No.: WO91/19628

PCT Pub. Date: Dec. 26, 1991

[30] Foreign Application Priority Data

Jun. 18, 1990 [JP] Japan .................................. 2-159067

[51] Int. Cl.$^5$ ...................... B60R 21/22; B60R 21/20
[52] U.S. Cl. .................... 280/728 B; 280/731
[58] Field of Search ............... 280/728, 728 A, 728 B, 280/730 R, 731; 74/552, 558.5

[56] References Cited

U.S. PATENT DOCUMENTS 4,148,503  4/1979  Shiratori et al. .
5,183,289  2/1993  Zeller et al. .......................... 280/731

FOREIGN PATENT DOCUMENTS 9001948   6/1990  Fed. Rep. of Germany .
63-212147 9/1988  Japan .................................. 280/743
3-235738  10/1991 Japan ............................. 280/728 B Primary Examiner—Karin L. Tyson
Attorney, Agent, or Firm—Kanesaka and Takeuchi

[57] ABSTRACT

A modular cover (1) provides for large deformation of a flap to allow rapid deployment of an air bag in all directions. The modular cover (1) includes tear lines (2, 3, 4), and engaging portions at its lateral sides to join spokes (12) of a steering wheel. Ends of the tear lines (3, 4) extend along the engaging portions.

3 Claims, 4 Drawing Sheets

MODULAR COVER FOR AN AIR BAG ASSEMBLY

TECHNICAL FIELD

The present invention relates to a modular cover for use in an air bag assembly and particularly, to a modular air bag cover rupturable so that flaps may easily and largely be bent to provide for full deployment of an air bag.

BACKGROUND ART

As shown in FIG. 4, an air bag assembly is disposed centrally on a vehicle steering wheel 10, which upon collision of a vehicle deploys and inflates an air bag. This air bag assembly includes a mounting plate, commonly referred to as a retainer. An inflator and an air bag are mounted to the mounting plate and covered by a modular cover 11. As shown in FIG. 5, the modular cover 11 has engaging portions 11a, 11b at its lateral sides to join spokes 12 of the steering wheel.

The modular cover 11 has tear lines 13 along which the modular cover can be ruptured when the air bag is deployed. The tear lines are in the form of a continuous groove or a semicontinuous groove. The tear lines may alternatively include spaced grooves of greater depth. When the cover has two different layers, i.e. a rigid layer and a soft layer, a slit may be formed in the rigid layer so that the cover may be ruptured along a predetermined line.

In the prior art modular cover 11, the tear lines 13 include tear lines 13a, 13b extending vertically along lateral sides of the cover 11, and a central tear line 13c extending centrally and laterally of the cover 11 as shown in FIGS. 4 and 5. A vertical direction is a direction from an occupant M toward a windshield G. A lateral direction is the width direction of a vehicle. In this case, the steering wheel is so oriented as to permit the vehicle to run on a straight line.

The tear lines 13a, 13b of the prior art modular cover 11 have ends P positioned substantially at the center of the engaging portions 11a, 11b of the modular cover 11 to join spokes 12. The modular cover 11 has portions S which extend from the ends P to the lower ends of the engaging portions 11a, 11b and remain unbroken when the cover 11 is ruptured. As a consequence, a flap (lower flap) of the modular cover 11 adjacent to the occupant is bent along a line P—P. A portion of the modular cover around the line P—P has a relatively high bending rigidity. This may prevent large bending of the lower flap.

DISCLOSURE OF THE INVENTION

It is an object of the present invention to solve the problem encountered in the prior art and to provide a modular cover for use in an air bag assembly, which can fully rupture to allow an air bag to be very easily inflated in all directions.

The present invention provides a modular cover for use in an air bag assembly comprising tear lines along which the cover can rupture, and engaging portions at its lateral sides to join spokes of a steering wheel, wherein the tear lines have ends extending along the engaging portions.

In the modular air bag cover of the present invention the ends of the tear lines extend along the engaging portions. Thus, the modular cover can be ruptured along the engaging portions to provide a fully bent flap when the air bag assembly is actuated.

BEST MODE FOR CARRYING OUT THE INVENTION

The present invention will now be described in more detail, by way of example, with reference to the drawings.

Figure 1:
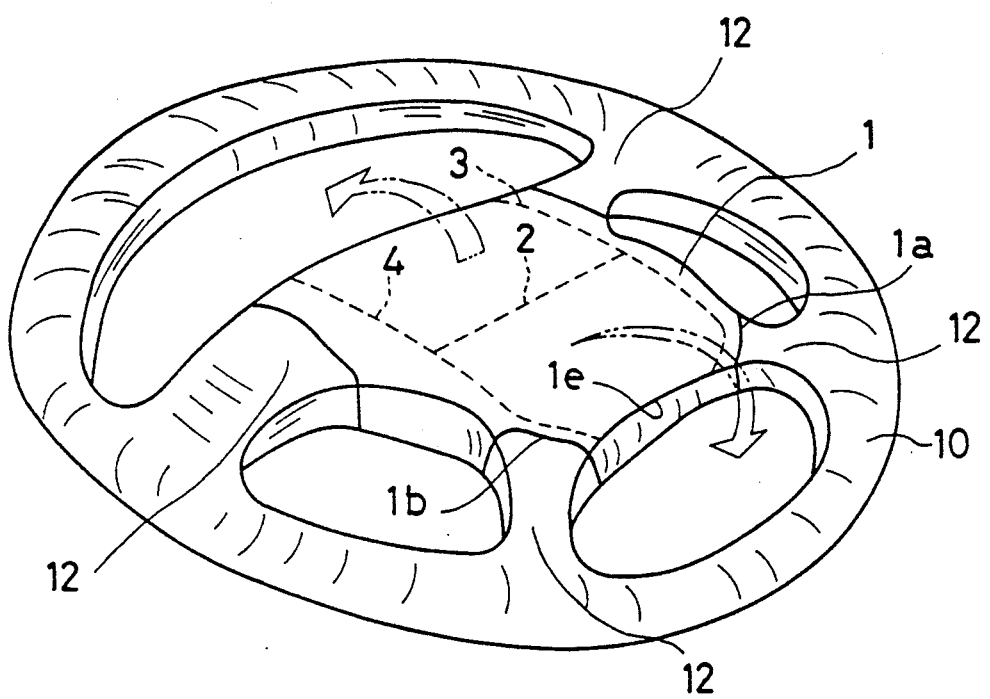
FIG. 1 is a perspective view of a steering wheel on which a modular cover for an air bag assembly according to one embodiment of the present invention is mounted.
Figure 2:
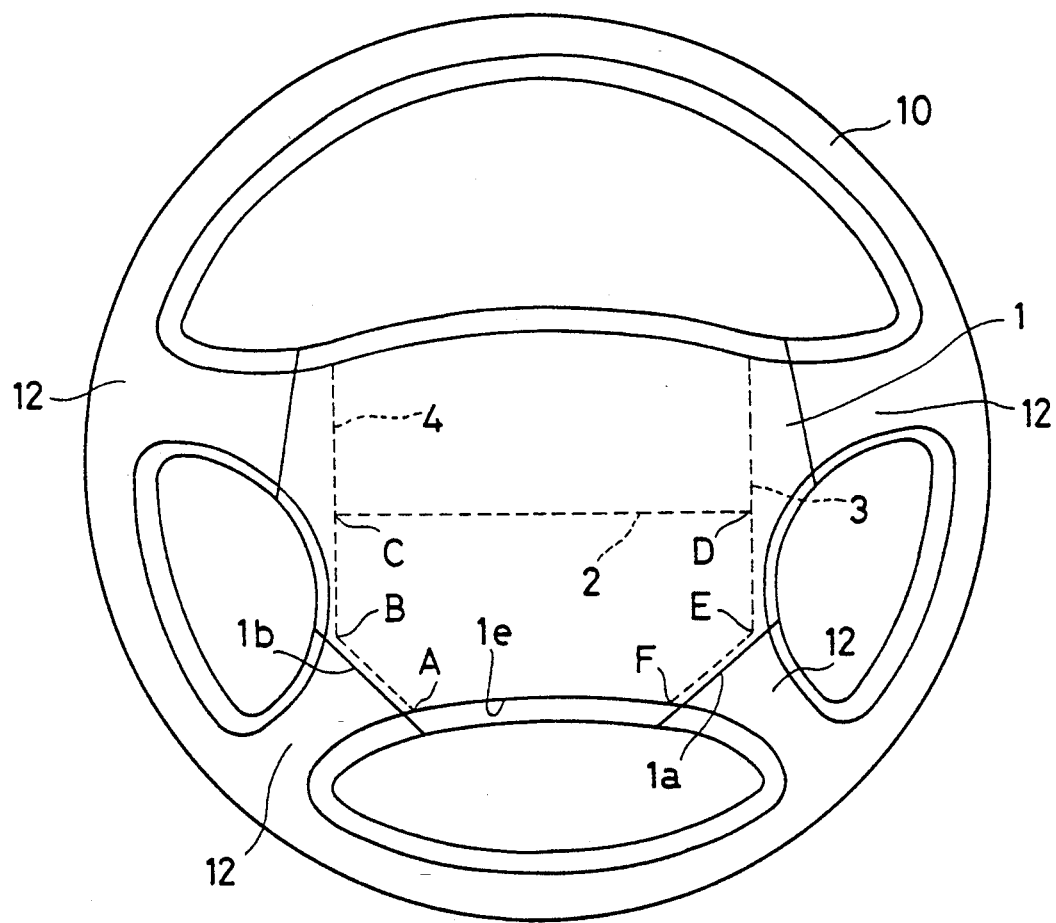
FIG. 2 is a front view of the steering wheel.
Figure 3:
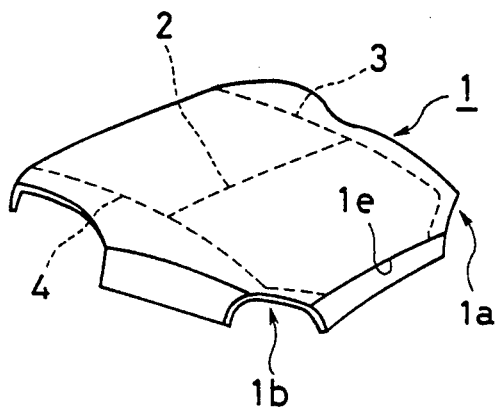
FIG. 3 is a perspective view of the modular cover.

FIG. 1 is a perspective view of a steering wheel on which is mounted a modular cover for an air bag assembly, made according to one embodiment of the present invention. FIG. 2 is a front view of the steering wheel. FIG. 3 is a perspective view of the modular cover. In FIGS. 1 and 2, 10 is a steering wheel, and 12 are spokes.

Referring to FIGS. 1 to 3, a modular cover 1 is substantially rectangular in shape and includes a central tear line 2 and side tear lines 3, 4 all rupturable when an air bag is deployed. The central tear line 2 extends centrally across the cover 1. The tear lines 3, 4 extend vertically along lateral sides of the cover 1 adjacent to its edges. The central tear line 2 and the tear lines 3, 4 are connected together. Engaging portions 1a, 1b are formed at the lower portion of the cover 1 to join the spokes 12 of the steering wheel and terminate at an upper edge 1e of the cover.

Figure 5:
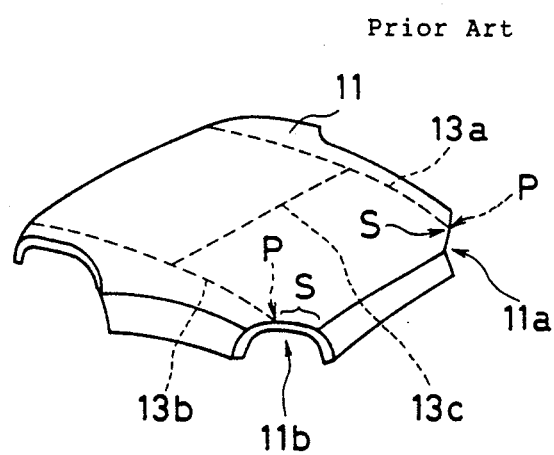
FIG. 5 is a perspective view of the conventional modular cover.
Figure 4:
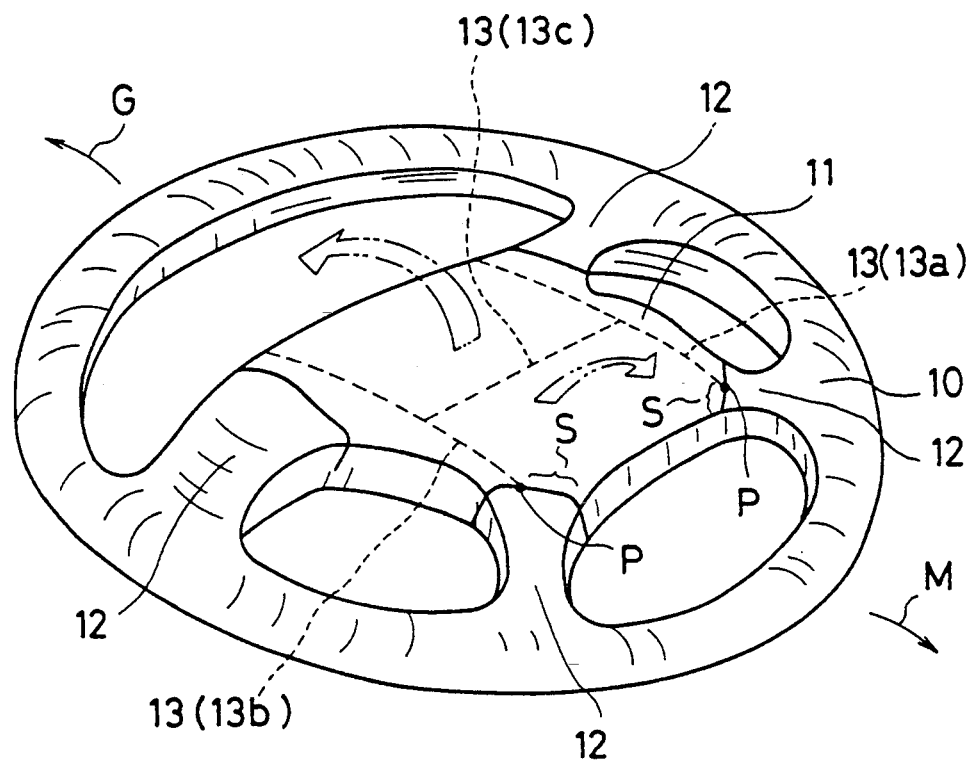
FIG. 4 is a perspective view of a steering wheel on which a conventional modular cover is mounted.

The modular cover 1 thus constructed is ruptured to the edge 1e when the air bag is deployed. The edge 1e of the cover is less in flexural rigidity than a portion of the cover around the line P—P (see FIGS. 4 and 5). Thus, when the cover is ruptured to provide a lower flap (surrounded by a broken line extending from a point A to a point F through points B to E), this lower flap can easily and largely be bent from the upper edge 1e (line extending between the point A and the point F) of the modular cover. This results in rapid and large deployment of the air bag in all directions.

Figure 6:
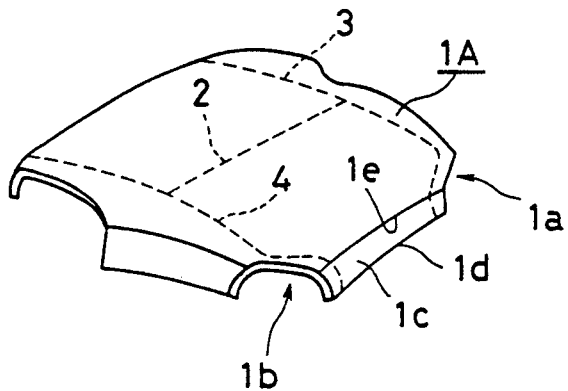
FIG. 6 is a perspective view of a modular cover according to another embodiment of the present invention.

FIG. 6 illustrates another embodiment.

In a modular cover 1A shown in FIG. 6, the tear lines 3, 4 extend along the engaging portions 1a, 1b and across one side 1c of the cover and terminate at a lower edge 1d of the cover. The other structure of the modular cover 1A is identical to that of the modular cover 1 shown in FIGS. 1 to 3.

Also, in the modular cover 1A, the tear lines 3, 4 extend along the engaging portions of the cover and terminate at the edge 1d. Thus, the modular cover can be ruptured to the edge 1d to provide for large and rapid bending of the lower flap when the air bag is deployed. This allows the air bag to be rapidly and substantially inflated in all directions.

In the present invention, the tear lines 3, 4 may terminate at a point between the edges 1e and 1d.

INDUSTRIAL APPLICABILITY

As is clear from the foregoing embodiments, the modular cover of the present invention is ruptured at least to its upper edge when the air bag is deployed. The resulting flap can be largely deformed to rapidly and substantially inflate the air bag in all directions. This enables soft inflation.

I claim:

1. A modular cover for an air bag assembly, comprising:
   - a main portion extending substantially horizontally over an entire outer surface of the modular cover,
   - two upper engaging portions adapted to join to two spokes of a steering wheel and situated at upper side portions of the main portion,
   - two lower engaging portions adapted to join to two spokes of the steering wheel and situated at lower side portions of the main portion,
   - an upper edge portion situated between the upper engaging portions and extending from the main portion in a direction away from the outer surface of the modular cover,
   - a lower edge portion situated between the lower engaging portions and extending from the main portion in a direction away from the outer surface of the modular cover,
   - a first tear line extending centrally across the main portion in a direction for linking the two upper engaging portions, said first tear line having lateral ends, and
   - second and third tear lines intersecting the respective lateral ends of the first tear and extending substantially perpendicularly to the first tear line, said respective second and third tear lines extending linearly from the upper edge portion to portions adjacent to the lower engaging portions, changing directions toward the lower edge portion and extending linearly along the lower engaging portions to the lower edge portion so that when the air bag is inflated, a portion of the main portion between the first tear line and the lower edge portion is fully turned without preventing inflation of the air bag.

2. A modular cover according to claim 1, wherein said lower edge portion has rigidity less than that at the lower engaging portions.

3. A modular cover according to claim 2, wherein said second and third tear lines further extend throughout the lower edge portion.

* * * * *